US010738135B2

(12) United States Patent
Querci et al.

(10) Patent No.: US 10,738,135 B2
(45) Date of Patent: *Aug. 11, 2020

(54) PROCESS FOR EXTRACTING RESIN AND RUBBER FROM GUAYULE PLANTS

(71) Applicant: Versalis S.p.A., San Donato Milanese (IT)

(72) Inventors: Cecilia Querci, Novara (IT); Maria Caldararo, Trecate (IT); Mirko Oliosi, Castelnuovo del Garda (IT); Matteo Russo, Cerano (IT)

(73) Assignee: Versalis S.P.A., San Donato Milanese (IT)

(*) Notice: Subject to any disclaimer, the term of this patent is extended or adjusted under 35 U.S.C. 154(b) by 144 days.

This patent is subject to a terminal disclaimer.

(21) Appl. No.: 16/062,178

(22) PCT Filed: Dec. 13, 2016

(86) PCT No.: PCT/IB2016/057565
§ 371 (c)(1),
(2) Date: Jun. 14, 2018

(87) PCT Pub. No.: WO2017/103775
PCT Pub. Date: Jun. 22, 2017

(65) Prior Publication Data
US 2018/0371112 A1 Dec. 27, 2018

(30) Foreign Application Priority Data

Dec. 14, 2015 (IT) .................. 102015000082671

(51) Int. Cl.
C08C 1/06 (2006.01)
C08C 1/075 (2006.01)
(Continued)

(52) U.S. Cl.
CPC .................. C08C 1/06 (2013.01); C08C 1/02 (2013.01); C08C 1/075 (2013.01); C08J 99/00 (2013.01);
(Continued)

(58) Field of Classification Search
None
See application file for complete search history.

(56) References Cited

U.S. PATENT DOCUMENTS 2,434,412 A * 1/1948 Jones ........................ C08C 4/00
528/490
2,459,369 A * 1/1949 Tint ........................ B01D 11/04
528/493
(Continued)

FOREIGN PATENT DOCUMENTS

CN 104271606 A 1/2015
EP 0164137 A2 12/1985
(Continued)

OTHER PUBLICATIONS

International Search Report and Written Opinion on PCT/IB2016/057565, dated Mar. 16, 2017, 12 pages.
(Continued)

Primary Examiner — Peter A Salamon
(74) Attorney, Agent, or Firm — Praedcere Law

(57) ABSTRACT

The present invention relates to the sector of the industry for extracting and processing natural rubber, and other components, from plant material. In particular, the invention relates to a process for extracting resin and rubber from guayule and/or guayule type plants, which comprises harvesting, preserving and mechanically and chemically treating the parts of the plant, applicable both in the laboratory and on an industrial scale, characterized by significantly high quantity yields and high quality of the extracted products.

24 Claims, 3 Drawing Sheets

Figure 1:
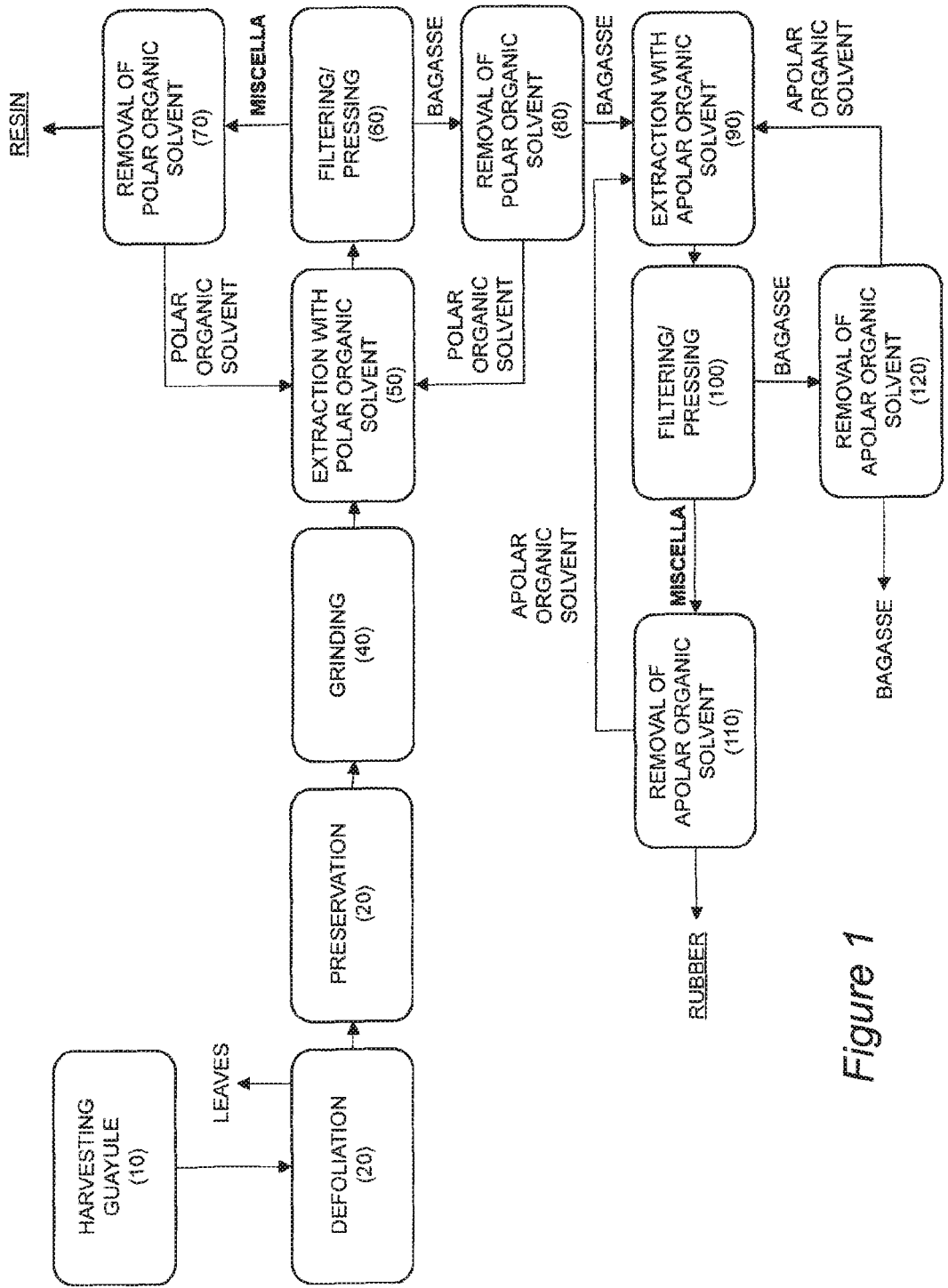

(51) Int. Cl.
*C08C 1/02* (2006.01)
*C08J 99/00* (2006.01)
*C08L 7/02* (2006.01)

(52) U.S. Cl.
CPC .............. *C08L 7/02* (2013.01); *C08J 2307/02* (2013.01); *C08L 2201/54* (2013.01)

(56) References Cited

U.S. PATENT DOCUMENTS

| | | | | |
|---|---|---|---|---|
| 4,159,903 | A * | 7/1979 | Bauman | A01N 33/04 504/244 |
| 4,435,337 | A * | 3/1984 | Kay | C08J 11/06 528/491 |
| 4,526,959 | A * | 7/1985 | Kay | C08J 11/06 526/348 |
| 4,623,713 | A * | 11/1986 | Beinor | C08C 2/00 526/335 |
| 4,681,929 | A * | 7/1987 | Cole | C09F 1/00 528/493 |
| 7,923,039 | B2 * | 4/2011 | Cornish | B01D 11/0284 424/725 |
| 8,431,667 | B2 * | 4/2013 | Cornish | A61F 6/04 525/331.9 |
| 2012/0063969 | A1 * | 3/2012 | Cornish | B01D 11/0284 422/261 |
| 2014/0288255 | A1 * | 9/2014 | Martin | C08C 2/02 526/340.4 |
| 2015/0232583 | A1 * | 8/2015 | Fraley | B01D 11/0288 526/335 |
| 2018/0371111 | A1 * | 12/2018 | Querci | C08C 1/02 |

FOREIGN PATENT DOCUMENTS

| | | |
|---|---|---|
| GB | 2164341 A | 3/1986 |
| WO | WO 2013/134430 A1 | 9/2013 |
| WO | WO2013134429 A1 | 9/2013 |
| WO | WO 2014/047176 A1 | 3/2014 |
| WO | WO2017/103769 A1 | 6/2017 |
| WO | WO2017/103782 A1 | 6/2017 |

OTHER PUBLICATIONS

Swansons et al, "Molecular Weights of Natural Rubbers from Selected Temperate Zone Plants", Journal of Applied Polymer Science, vol. 23, Dec. 31, 1979 (Dec. 31, 1979), pp. 743-748, XP002761161. the whole document.
S. Macrae, M.G. Gilliland, J. Van Staden in "Rubber production in guayule: determination of rubber producing potential" (1986) Plant Physiol. vol. 81, pag. 1027-1032.
IUPAC Recommendation "Dispersity in polymer science" (2009), Pure Appl. Chem. vol. 81 pag. 351-353.
F.S. Nakayama in "Guayule future development" (2005) Industrial Crops and Products, vol. 22, pag. 3-13.
M. Geppi, F. Ciardelli, C,A. Veracini, C. Forte, G. Cecchin, P. Ferrari, in "Dynamics and morphology of polyolefinic elastomers by means of 13C and 1H solid-state n.m.r." (1997), Polymer, vol. 38, pag. 5713-5723.
First Office Action issued by the Patent Office of CNIPA dated Mar. 3, 2020 for Chinese Patent Application No. 2016800704488.

* cited by examiner

PROCESS FOR EXTRACTING RESIN AND RUBBER FROM GUAYULE PLANTS

The present invention relates to the sector of the industry for extracting and processing natural rubber, and other components, from plant material.

In particular, the invention relates to a process for extracting resin and rubber from guayule plants, which comprises harvesting, preserving and mechanically and chemically treating the parts of the plant, applicable both in the laboratory and on an industrial scale, characterized by significantly high quantity yields and high quality of the extracted products.

Guayule (*Parthenium argentatum*) is a perennial shrub native of the semidesert regions of the South-western U.S.A. (in particular Texas) and Northern Mexico. This plant accumulates natural rubber, mainly comprising cis-1,4 polyisoprene, in the form of latex (a milky dispersion or suspension in water) especially in the bark of the branches and stems. The natural rubber content can depend on various environmental, farming and preservation factors and is therefore comprised between 5 and 20% of the total weight of the dry plant.

The extraction of natural rubber from guayule plants, as from other plants belonging to the genera of Asteraceae, Euphorbiaceae, Campanulaceae, Labiatae and Moraceae, such as, *Euphorbia lathyris, Parthenium incanum, Chrysothamnus nauseosus, Pedilanthus macrocarpus, Cryptostegia grandiflora, Asclepias syriaca, Asclepias speciosa, Asclepias subulata, Solidago altissima, Solidago graminifolia, Solidago rigida, Sonchus arvensis, Silphium* spp., *Cacalia atriplicifolia, Taraxacum kok-saghyz, Pycnanthemum incanum, Teucrium canadense, Campanula americana* (indicated in short by the term "guayule type"), represents an important alternative to the extraction of natural rubber from *Hevea brasiliensis*, especially considering the greater resistance of these species to pathogenic agents that attack *Hevea*, the lower import costs of the plant raw material and in virtue of the lower content, in rubber extracted from these plants compared to that derived from *Hevea*, of numerous protein contaminants responsible for type I latex allergies (or IgE-mediated).

For these reasons, over recent years numerous studies have been conducted for the purpose of developing methods and technologies for extracting natural rubber from non-*Hevea* plants, for example from guayule or guayule type plants.

It is important to note that, while *Hevea brasiliensis* natural rubber is obtained by collecting the latex present in the latex ducts along the bark by making cortical incisions in said channels, the natural rubber of the guayule plant accumulates within the plant cells (stem, leaves and roots) and can be obtained by crushing the plant material and collecting the cell components with physical and/or chemical methods.

The processes of the prior art envisage the extraction of the rubber from the guayule plants by grinding the plants and extracting the rubber itself with water or organic solvents.

For example, international patent WO 2014/047176 describes a method for extracting rubber from guayule which envisages a "post-harvest" (or "pre-extraction") treatment that comprises the partial drying of the plant material. In fact, WO 2014/047176 demonstrates that when rubber from guayule is extracted from plant material containing residual moisture levels below determined values, it is characterized by a significantly lower molecular weight and therefore is of lower quality. The extraction efficiency also drops in relation to the reduction in the residual moisture level. The extraction described in the aforementioned application is performed with mixtures of apolar and polar organic solvents (e.g. pentane/acetone).

In fact, most of the processes described in the prior art, from the viewpoint of only recovering the rubber, envisage the extraction in a single stage of all the main components that can be obtained from the guayule plant.

However, for the purpose of meeting the quality standards (e.g. the standards defined by ASTM International), the natural rubber must be substantially pure, i.e. free from other compounds extractable from plant material and from other contaminants. For this reason, methods have been developed that comprise removal stages of the aforementioned compounds extractable from the guayule plant, particularly resin.

International patent application WO 2013/134430 describes a process for extracting natural rubber from non-*Hevea* plants, which envisages harvesting the guayule plants, removing most of the leaf apparatus and partial drying of the plant material.

After crushing and grinding, the plant material is placed in suspension in the presence of a polar organic solvent (e.g. acetone) and an apolar organic solvent (e.g. hexane). After separating the bagasse from the suspension, a suspension, or miscella, is obtained, which contains rubber and resin. Further polar organic solvent is added to this miscella so as to cause the coagulation of the rubber into particles, which are separated by sedimentation. WO 2013/134430 does not described the recovery of the residual resin from the miscella from which the high molecular weight rubber has been isolated, since the main interest is aimed at the removal of contaminants from the suspension containing the rubber.

U.S. Pat. No. 4,681,929 describes a process for preparing rubber from guayule, made in a single stage, in which the plant material is subjected to extraction with polar organic solvents (e.g. methanol) and apolar (e.g. hexane), hence obtaining a miscella that contains both rubber and resin. In a preferred aspect of the invention, the process envisages a first extraction of the resin with polar organic solvent and a second extraction of the rubber using apolar organic solvent. A particularity of the process described in U.S. Pat. No. 4,681,929 consists of the use of the miscella itself as an extraction agent, added to fresh solvent in a percentage of up to 90%, hence reducing the quantity of solvent required for the extraction.

Furthermore, the solution containing resin and/or rubber, is separated from the bagasse by pressing rather than by sedimentation or gravity drainage. In this way, the volumes of bagasse to be rinsed are particularly reduced, allowing the use of organic solvent to be limited further. However, again in this case, the resin is considered to be a contaminant of the rubber, to be removed and eliminated.

However, for some time, resin from guayule, produced by the plant in comparable if not higher quantities than rubber, has been used for various purposes including, by way of example, the manufacture of adhesives and the production of wooden panels that are resistant to pest attack. For this reason, in some processes described in the prior art, importance is also given to the extraction of this component.

For example, U.S. Pat. No. 4,435,337 describes a process for extracting rubber, resin, water-soluble compounds and bagasse which takes its inspiration from the "historical" process for extracting rubber from guayule, called the "Saltillo process" (described in the volume "Guayule: An Alternative Source of Natural Rubber", 1977, National Academy of Sciences). The process described in U.S. Pat.

No. 4,435,337 comprises a preliminary step of partially drying the plant material, then extracting the resin with anhydrous acetone and a recovery step of the rubber, the water-soluble compounds and the bagasse through floatation of the rubbery material, the latter step in analogy with the old Saltillo process. U.S. Pat. No. 4,435,337 highlights the fact that the extraction of the resin is much more efficient the more the extracting solvent contains reduced quantities of water. It is also observed that, unexpectedly, for extracting the resin itself from the plant material, it is more advantageous to use the miscella containing concentrated resin than to use fresh solvent.

Patent application US2014/0288255 describes a process for separating rubber, resin and bagasse, comprising a first step of homogenizing the plant material in presence of a means able to solubilize the resin, which is then separated from the bagasse; a second step of homogenizing the bagasse in presence of a solvent able to solubilize the rubber that is then separated from the bagasse; a final step of drying the rubber and the bagasse which may comprise, for example, solvent evaporation in wiped film evaporators and the extrusion of the rubber. US2014/0288255 further describes a process in which the plant material is homogenized in presence of a "milling solvent" able to solubilize the rubber and the resin, which are separated from one another in a subsequent purification stage using a fractionation solvent.

It is important to note that while US2014/0288255 emphasizes the importance of the correct time of harvesting the plant, by hedging or pollarding, it does not provide any information on the usefulness of any drying of the plants after harvest.

Again, the process described in European patent EP 0 164 137 does not provide a step of drying the plant material. On the contrary, EP 0 164 137 underlines the importance of processing the guayule plants straight after harvesting. In accordance with the process of EP 0 164 137, the whole guayule plant is subjected to extraction through counter-gravity percolation with organic solvents (e.g. hexane, or the miscella obtained from the aforementioned extraction) able to solubilize both the resin and the rubber. In a second step, a non-solvent of the rubber (e.g. acetone) is added to the miscella obtained from the extraction, which causes the precipitation of the latter. The deresinated rubber is then recovered in relatively pure form through washing and reprecipitation followed by filtration and/or centrifugation.

The Applicant has identified at least three drawbacks in the processes of the prior art:
1. The processes that envisage the extraction of rubber and resin in a single stage do not allow the resin, which, as described above, has an intrinsic commercial value, to be quantitatively recovered;
2. The processes that envisage the extraction of rubber and resin in a single stage and the subsequent separation from the resin, allow rubber to be obtained which does, however, require further purification steps in order to meet the quality standards that the market demands;
3. The bagasse obtained after extraction in a single stage, whether it is carried out with organic solvents or with water, may still contain significant quantities of rubber and resin and, therefore, may be considered unsuitable for different uses than being exploited as fuel (e.g. in agriculture or in animal feeding).

The Applicant therefore set out to solve the problem of identifying a new process for preparing rubber, resin and bagasse starting from guayule plants, so as to obtain the aforementioned components with better yields, and qualitative characteristics of the products, with respect to the processes of the prior art.

It is therefore an object of the present invention to provide a process for extracting resin and rubber from guayule plants characterized by measures aimed at obtaining the maximum extraction yield, which is substantially free from the drawbacks of the prior art highlighted above.

For the purposes of the present description and following claims, the definitions of the numeric ranges always include the extremes unless specified otherwise.

For the purposes of the present description and the following claims, unless specified otherwise, all the ratios and percentages are by weight.

In the description of the embodiments of the present invention, the use of the terms "comprising" and "containing" indicates that the options described, for example regarding the steps of a method or of a process or the components of a product or of a device, are not necessarily exhaustive. It is however important to note that the present application also relates to embodiments in which the term "comprising" in relation to the options described, e.g. regarding the steps of a method or of a process or the components of a product or of a device, must be interpreted as "which essentially consists of" or "which consists of", even if this is not explicitly stated.

In the present description and following claims, guayule plant generally means both the *Parthenium argentatum* species and guayule type plants of the species listed above.

For the purpose of the present invention, the term "plant material" means any form (e.g. the whole plant, parts of the plant, including roots, branches and/or stem, leaves, any bark, fragments of plant obtained by chopping, grinding etc. briquettes and pellets obtained by compacting plant fragments) wherein the guayule plant is used for the purpose of extracting, by means of chemical and/or physical methods, the rubber, the resin and other components present in the plant itself.

The term "bagasse" means the residual portion of plant material deriving from the extraction processes. The bagasse may also include some quantities of non-plant material (e.g. soil, sand, etc.) typically associated with the roots of the plants and deriving from the farming land.

For the purpose of the present invention, the term "miscella" means a solution, a suspension or an emulsion comprising rubber and/or resin, water and/or organic solvents in which the extraction process is performed, obtained after separation of the bagasse.

For the purpose of the invention, the term "volatile matter" refers to compounds different from rubber which may be contained within a sample of rubber in the solid state, but which pass into the vapor phase and can be separated from said sample at temperatures greater than or equal to 100° C.

The determination of the volatile matter present in a sample of rubber in the solid state may be performed, for example, through the standard test ASTM D1278-91 (1997), known to a person skilled in the art.

The determination of volatile organic compounds, or "VOCs" (e.g. the apolar organic solvent present in a sample of rubber in the solid state) and their residual concentration is also performed through gas chromatography with a flame ionization detector, using a standard solution of the aforementioned VOCs at a known concentration.

Further characteristics and advantages of the present invention shall become clear from the following detailed description and with reference to the appended figures, which intend to illustrate the general characteristics of the method, the structure and/or the materials used in embodiments of the invention and to complete the written description below.

In particular, FIG. 1 is a complete block diagram of an embodiment of the method according to the present invention, starting from whole guayule plants.

Figure 2:
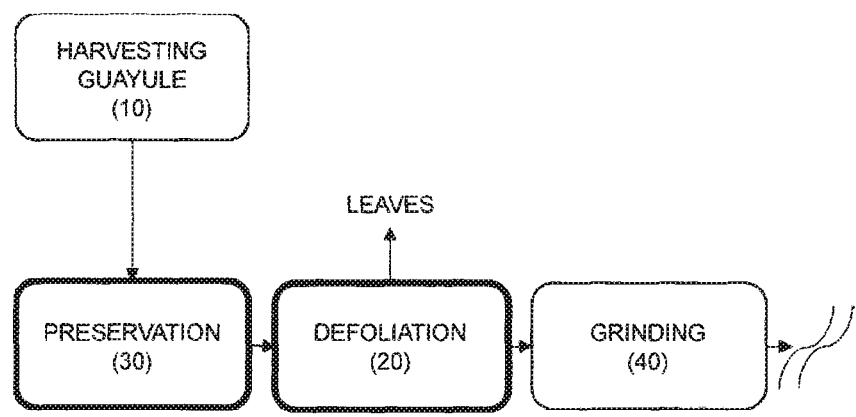

FIG. 2 is a block diagram that represents a part of the process according to an alternative embodiment of the present invention, wherein the defoliation ("b") and preservation ("c") steps are in the reverse order. For more clarity, the numbering of the steps has not been changed. In said figure, steps "b" and "c" are represented in bold boxes.

Figure 3:
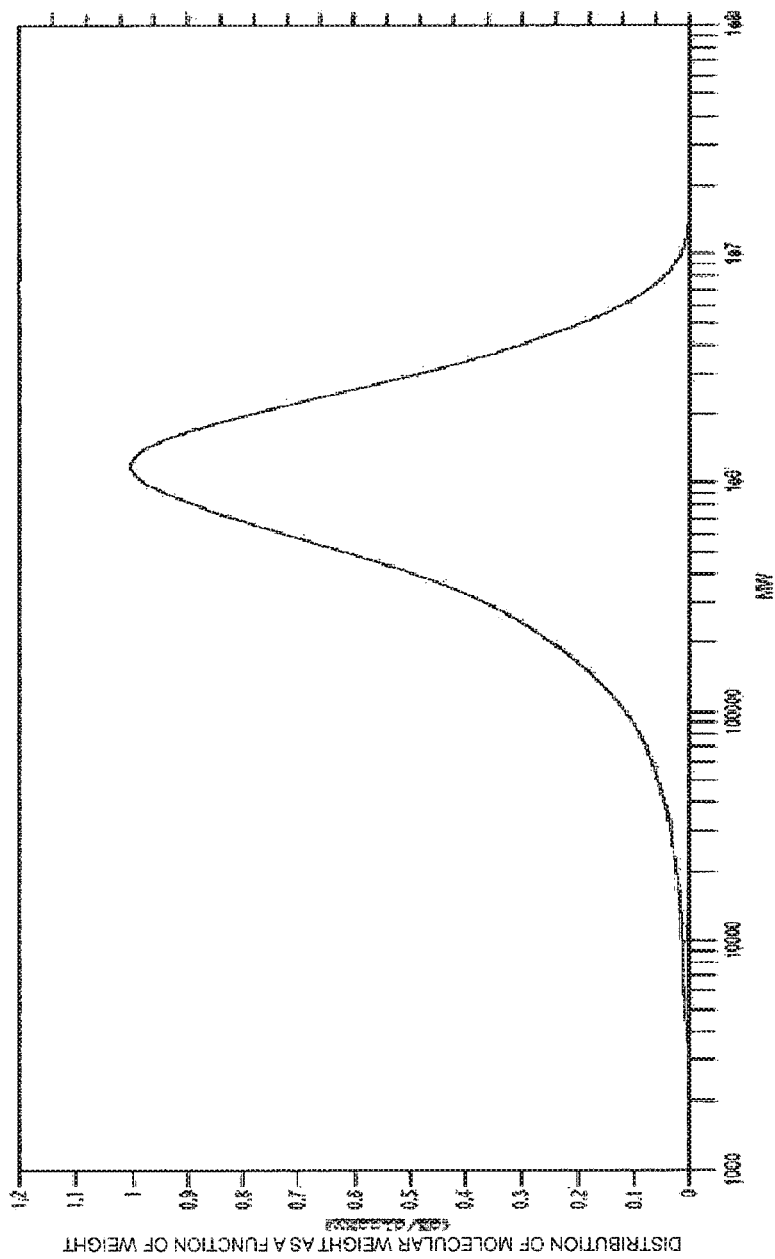

FIG. 3 shows the distribution of the molecular weights (MW) of the natural rubber obtained with the process in accordance with the invention, determined through gel permeation chromatography (GPC), conveniently performed in accordance with the standard method ISO 11344:2004, IDT ("Rubber, raw, synthetic—Determination of the molecular-mass distribution of solution polymers by gel permeation chromatography"), using polystyrene as a standard. Such method is known to a person skilled in the art.

It is important to note that the figures mentioned above intend to illustrate the general characteristics of the method, the structure and/or the materials used in some embodiments of the invention and to complete the written description below.

These figures are not, however, drawn to scale and may not accurately reflect the precise structural characteristics or performance of a given embodiment and as such should not be interpreted as defining or limiting an interval of values or properties of said embodiment. The use of similar or identical reference numbers in the figures intends to indicate the presence of one or more elements or one or more similar or identical functions.

The present invention relates to a process for extracting resin and rubber from guayule plants, comprising:
a. harvesting guayule plants;
b. defoliating said plants;
c. preserving the defoliated plants in environments at controlled temperature and relative humidity, for a time comprised between 7 and 21 days, so that the residual moisture contained in the plant is maintained in the range of 30-45%;
d. grinding said defoliated plants up to obtain a plant material comprising plant fragments with average sizes between 0.5 and 10 mm;
e. dispersing said plant material in a polar solvent system, comprising at least one polar organic solvent and a stabilizer system, to obtain a suspension;
f. subjecting the obtained suspension from step "e" to filtration/pressing to separate a first miscella comprising said resin from a first bagasse;
g. removing the at least one polar organic solvent from said first miscella to obtain the concentrated resin;
h. removing the at least one polar organic solvent from the first bagasse obtained in step "f";
i. dispersing said first desolventized bagasse obtained in step "h" in an apolar solvent system, comprising at least one apolar organic solvent and a stabilizer system, to obtain a suspension;
j. subjecting said suspension obtained in step "i" to filtration/pressing to separate a second miscella comprising said rubber from a second bagasse;
k. removing the at least one apolar organic solvent from said second miscella to obtain rubber in the solid state;
l. removing the at least one apolar organic solvent from the second bagasse obtained in step "j".

Preferably, the steps of the aforementioned process may be performed in sequence from "a" to "l". As described better below, in some embodiments of the invention, some of the aforementioned steps may be performed in the reverse order with respect to the above list, without changing the general principle of the invention.

With respect to the processes of the prior art, the process in accordance with the present invention envisages the separate extraction of the resin and the rubber from guayule plants, preventing contact between the two different organic solvents. In this way, it is possible to recycle and reuse the organic solvents themselves, after each extraction process, without providing for complex solvent mixture separation steps.

Furthermore, the extraction of the rubber by using organic solvents instead of water has the advantage of not requiring the use of large amounts of water, to be necessarily subjected to a purification process prior to disposal. On the contrary, the use of organic solvents allows said solvents to be reused after each extraction step in a closed recycling system.

It is known that the accumulation of rubber in the different parts of the guayule plants depends on different factors, such as the age of the plant, the intensity of the environmental light, the availability of water, the temperature and the season. For example, in its places of origin the guayule plant accumulates rubber in the winter months, whereas in summer the production of resin is favoured (S. Macrae, M. G. Gilliland, J. Van Staden in "Rubber production in guayule: determination of rubber producing potential" (1986) *Plant Physiol.* vol. 81, pag. 1027-1032).

Preferably, the harvesting of the guayule plants in accordance with the invention is performed at the resumption of the vegetative period of said plants. Typically this period comprises spring and the beginning of summer.

In a preferred embodiment of the present invention, the whole guayule plants are harvested in the field by cutting the neck of the stem (if regrowth is envisaged), or by uprooting (if the plant does not have a shrubby development or regrowth is not chosen) (FIG. 1, box 10).

During harvesting, the plants may be harvested manually or by harvesting machinery, preferably with a size greater than or equal to 8 cm and less than or equal to 20 cm, in order to facilitate the subsequent storage and preservation operations.

Preferably the size may be comprised between 8 and 15 cm and even more preferably the size is comprised between 10 and 12 cm.

For the purposes of the present invention, in the steps subsequent to harvesting, and unless specified otherwise "plant" means both the whole plant and the fragments of plant in the harvest size.

After the harvest, the plants may be partially or totally defoliated (20).

The defoliation may be performed manually or mechanically through blade, roller or pneumatic defoliating machines. In this case, the separation of the leaves from the stems takes place thanks to vibrations and streams of air that exploit the lower density of the leaves with respect to the branches.

Preferably, at least 50% of the leaves are removed from said plants during step "b" of the aforementioned process, more preferably at least 90% of the leaves are removed from the plants.

After this, the defoliated plants may be subjected to a preservation treatment.

The Applicant has discovered that, unexpectedly, subjecting the guayule plants after harvesting and defoliation, to an appropriate preservation treatment, and partial drying, in an environment with controlled temperature and relative humidity (30), it is possible to extract high yields of a rubber characterized by a high weight average molecular mass.

Without wishing to refer to any particular theory, the metabolism of the plant may continue for a short period of time even after cutting and in special temperature and moisture conditions it is observed that the weight average molecular mass of the elastomer contained in the plant continues to increase, until it is even three times the starting value. Furthermore, the rubber extracted after the preservation step in accordance with the invention shows a reduced polydispersity index and a distribution of the weight average molecular masses of said elastomer within a very narrow range, a characteristic that contributes to defining the overall quality of the natural polymer.

As is known, the polydispersity index, or simply "dispersity", is represented by the ratio between weight average molecular mass and number average molecular mass (IUPAC Recommendation "Dispersity in polymer science" (2009), *Pure Appl. Chem.* vol. 81 pag. 351-353).

For the purposes of the present invention, an environment with a controlled temperature and relative humidity means a place where the temperature and relative humidity of the air are monitored and modified based on specific requirements.

The relative humidity (RH) is represented by the percentage ratio between the quantity of vapor contained by a volume of air and the maximum quantity (i.e. at saturation) that the same volume of air can contain under the same temperature and pressure conditions.

Residual moisture instead means the percentage of water contained in a sample of material. It is calculated as a difference by subtracting from 100 the amount of dry substance determined by weighing the sample after drying at a constant pressure and temperature of 90° C. for at least 24 hours.

In a preferred aspect of the invention, step "c" of the aforementioned process may be performed in an environment in which the temperature is kept constantly between 15 and 40° C.

In a further preferred aspect, said step "c" may be performed in an environment in which the temperature is kept between 20 and 30° C.

In a further preferred aspect, said step "c" of the process in accordance with the invention may be performed in an environment in which the relative humidity is kept consistently between 80% and 95%.

In a further preferred aspect, said step "c" may be performed in an environment in which the relative humidity is kept between 80% and 90%.

In a preferred aspect of the invention, step "c" of the aforementioned process may be performed for a time comprised between 10 and 15 days. An expert in the field is able to determine, based on the humidity contained in the plants that have just been cut, and based on the relative humidity and temperature conditions of the environment in which the preservation of the plants is performed, the duration of step "c" within the scope of the preferred range, so that the residual moisture of the plants remains within the range 30%-45%.

In a preferred aspect, at the end of step "c" of the aforementioned process, the residual moisture of the cut plants may be comprised between 35% and 40%.

In an embodiment of the invention, represented in FIG. 2, the preservation step "c" may precede the defoliation step "b". In this case the preservation may be performed on undefoliated guayule plants.

The grinding of the plants (or of parts of the plants) which takes place in step "d" may be performed with any method and equipment useful for the purpose (40). For example, grinding machines can be used such as chippers, crushers, granulators, blade mills, hammer mills, smooth or corrugated roll mills, stone mills and ball mills. Preferably said step "d" may be performed using one or more hammer mills. In a preferred aspect of the invention, said step "d" may be performed using in sequence one or more hammer mills and one or more corrugated roll mills.

In a preferred aspect, said step "d" may be performed using in sequence one or more hammer mills and one or more smooth roll mills.

In a preferred aspect, the fragments of plant material obtained through the grinding step "d" may have an average size comprised between 0.5 and 7.5 mm. In a further preferred aspect, said fragments have an average size comprised between 1 and 2 mm.

The plant material obtained through the grinding step may be quite quickly immersed in a polar solvent system (50) comprising at least one polar organic solvent and a stabilizer system.

In this step "e" the resin is extracted by the polar solvent system.

The volume of polar organic solvent to be used is calculated based on the weight of the plant material. In a preferred aspect, the ratio between the volume of the polar solvent system and the weight of the plant material may be comprised between 1 and 7, and is preferably comprised between 2 and 5.

Preferably the polar solvent system used in step "e" may comprise at least one polar organic solvent selected from an alcohol having from 1 to 8 carbon atoms (e.g. ethanol, isopropanol), ethers or esters having from 2 to 8 carbon atoms (e.g. ethyl acetate), cyclic ethers having from 4 to 8 carbon atoms, ketones having from 3 to 8 carbon atoms (e.g. acetone, methyl ethyl ketone), or mixtures thereof.

In a preferred aspect, the polar organic solvent may be selected from ethanol and acetone.

In a preferred aspect said polar organic solvent is ethanol.

The stabilizer system present in the polar solvent system may comprise at least one antioxidant. As antioxidants, hydroquinone derivatives, compounds derived from phenol substituted with sterically bulky groups or p-phenylenediamine with sterically hindered groups or mixtures thereof can be advantageously used. In a preferred aspect, the polar solvent system may comprise an antioxidant selected from aqueous mixtures comprising 2,5-di[tert-amyl]hydroquinone (CAS number 79-74-3) and sodium salt of polymerized alkyl naphthalene sulfonic acid (CAS numbers 9084-06-4/36290-04-7), aqueous mixtures with reaction products of p-cresol, dicyclopentadiene and isobutylene (CAS number 68610-51-5) and sodium salt of polymerized alkyl naphthalene sulfonic acid (CAS numbers 9084-06-4/36290-04-7), 4-[[4,6-Bis(octylthio)-1,3,5-triazin-2-yl]-amino]-2,6-di-tert-butylphenol (CAS number 991-84-4), N-1,3-dimethylbutyl-N'-phenyl-p-phenylenediamine (CAS number 793-24-8), or mixtures of N-1,3-dimethylbutyl-N'-phenyl-p-phenylenediamine (CAS number 793-24-8) and N-1,4-dimethylpentyl-N'-phenyl-p-phenylenediamine (CAS number 3081-01-4), or mixtures thereof. Preferably the polar solvent system comprises the antioxidant 4-[[4,6-Bis(octylthio)-1,3,5-triazin-2-yl]-amino]-2,6-di-tert-butylphenol.

In a preferred aspect, the polar solvent system may be placed in contact with the plant material in one or more stages in countercurrent, with or without agitation, for a time comprised between 0.1 and 5 hours, at a temperature between 25° C. and the boiling point of the polar organic solvent used.

In a preferred aspect, said step "e" is carried out for a time comprised between 0.5 and 2.5 hours.

In a preferred aspect, said step "e" is carried out at a temperature comprised between 35° C. and 50° C.

In a preferred aspect the polar solvent system and the plant material may be placed in contact with one another for a time comprised between 0.5 and 2.5 hours, at a temperature comprised between 35 and 50° C.

At the end, the suspension of said plant material in the polar solvent system is subjected to filtration/pressing (step "f", 60), for the purpose of separating from one another a suspension/liquid emulsion (so called "miscella") enriched in resin and a solid portion defined as "first bagasse".

Step "f" of the process in accordance with the invention may be performed with press filters, vacuum filters, screw presses, rotary presses, auger presses, membrane presses or with any other mechanical system suitable for separating a liquid phase from a solid phase.

In a preferred aspect, the filtration/pressing may be performed at a temperature comprised between 25° C. and 50° C. to promote the separation of the miscella enriched in resin from the bagasse that contains the rubber.

It is important to note that part of the rubber present in the plant material (particularly the so-called "low molecular weight" rubber, i.e. characterized by a weight average molecular mass of less than $2 \cdot 10^4$ g/mol) tends to be solubilized by the actual polar solvent used for extracting the resin.

In a preferred aspect, said filtration/pressing of step "f" of the process may be performed at a temperature comprised between 25° C. and 35° C. Under such conditions, the low molecular weight rubber tends to precipitate and can therefore be separated by filtration together with the bagasse. The miscella obtained therefore substantially only contains resin.

In a preferred aspect, said filtration/pressing can be performed at a temperature comprised between 35° C. and 50° C. Under such conditions, the low molecular weight rubber tends to remain in solution and therefore the miscella obtained after filtration/pressing, being able to comprise said low molecular weight rubber, according to the uses, may be subjected or not to a further separation step of the resin from the aforementioned low molecular weight rubber.

The miscella enriched in resin is appropriately treated (step "g", 70) so as to remove the polar organic solvent, which can be recycled in step "e" and recover the resin extracted from the plant in concentrated form.

Said treatment may be performed by evaporation through indirect heat and/or stripping with direct vapor and/or stripping with air at atmospheric pressure or under vacuum.

It is important to underline that together with the resin extracted from the plant in step "e", there may be a certain quantity of water present in the miscella which, in step "g" must be separated from the solvent, through the treatment described above or by distillation, before recycling the solvent itself in the extraction step "e".

Guayule resin may be used in many application fields as described, for example, by F. S. Nakayama in "Guayule future development" (2005) *Industrial Crops and Products*, vol. 22, pag. 3-13.

Resin is rich in secondary metabolites including glycerides of fatty acids, waxes and isoprene constituents belonging to the terpene family, of potential interest for the essence industry and for producing insect pheromones which, in some cases, have shown interesting properties for the pharmacological and cosmetic sector.

Furthermore, the resin fraction may be advantageously used in the treatment of timber materials used in building for increasing their resistance to atmospheric agents and attacks by parasites such as, for example, fungi and termites.

From the bagasse obtained by the filtration/pressing step "f", free from resin, but still containing rubber, the residual polar organic solvent is removed by evaporation through indirect heat and/or stripping with direct vapor and/or stripping with air at atmospheric pressure or under vacuum (step "h", 80).

In this way mixing between the polar solvent system and the apolar solvent system that is used in the subsequent rubber extraction step is prevented.

The polar organic solvent recovered from the removal step "h" (80) is combined with the same solvent recovered from the removal step "g" (70), and recycled in step "e" (50), possibly following distillation to eliminate the residual water content.

The bagasse, free from resin and the polar organic solvent, is then subjected to a second extraction step in step "i", through dispersion in an apolar solvent system (90) comprising at least one apolar organic solvent and a stabilizer system. In this step, the rubber extraction by means of the apolar solvent system occurs.

The volume of said apolar solvent system to be used is calculated based on the weight of the first bagasse. In a preferred aspect, the ratio between the volume of the apolar solvent system and the weight of the first bagasse may be comprised between 1.5 and 7, and preferably is comprised between 2 and 5.

The apolar solvent system used in step "i" may comprise at least one hydrocarbon solvent. Preferably, said at least one solvent may be selected from linear or branched alkanes having from 4 to 9 carbon atoms (e.g. pentane, hexane, heptane), cycloalkanes and alkylcycloalkanes having from 5 to 10 carbon atoms (e.g. cyclopentane, cyclohexane), aromatic hydrocarbons having from 6 to 10 carbon atoms (e.g. benzene, toluene, xylene), or mixtures thereof.

In a preferred aspect, the apolar organic solvent is hexane.

In a preferred aspect, the apolar organic solvent is cyclohexane.

The stabilizer system present in the apolar solvent system may comprise at least one antioxidant. As antioxidants, hydroquinone derivatives, compounds derived from phenol substituted with sterically bulky groups or p-phenylenediamine with sterically hindered groups or mixtures thereof can be advantageously used. In a preferred aspect, the apolar solvent system may comprise an antioxidant selected from aqueous mixtures comprising 2,5-di[tert-amyl]hydroquinone (CAS number 79-74-3) and sodium salt of polymerized alkyl naphthalene sulfonic acid (CAS numbers 9084-06-4/36290-04-7), aqueous mixtures with reaction products of p-cresol, dicyclopentadiene and isobutylene (CAS number 68610-51-5) and sodium salt of polymerized alkyl naphthalene sulfonic acid (CAS numbers 9084-06-4/36290-04-7), 4-[[4,6-Bis(octylthio)-1,3,5-triazin-2-yl]-amino]-2,6-di-tert-butylphenol (CAS number 991-84-4), N-1,3-dimethylbutyl-N'-phenyl-p-phenylenediamine (CAS number 793-24-8), or mixtures of N-1,3-dimethylbutyl-N'-phenyl-p-phenylenediamine (CAS number 793-24-8) and N-1,4-dimethylpentyl-N'-phenyl-p-phenylenediamine (CAS number 3081-01-4), or mixtures thereof. Preferably the polar solvent system comprises the antioxidant 4-[[4,6-Bis(octylthio)-1,3,5-triazin-2-yl]-amino]-2,6-di-tert-butylphenol.

In a preferred aspect, the apolar solvent system may be placed in contact with the first bagasse in one or more stages in countercurrent, with or without agitation, for a time comprised between 0.1 and 5 hours, at a temperature between 25° C. and the boiling point of the apolar organic solvent used.

In a preferred aspect, said step "i" is performed for a time comprised between 0.5 and 2.5 hours.

In a preferred aspect, said step "i" is performed at a temperature comprised between 35° C. and 60° C.

In a preferred aspect, the apolar solvent system and the first bagasse are placed in contact with one another for a time comprised between 0.5 and 2.5 hours, at a temperature comprised between 35° C. and 60° C.

At the end, the bagasse suspension in apolar organic solvent is subjected to filtration/pressing (step "j", 100), for the purpose of separating from one another a second miscella enriched in rubber and a second bagasse substantially free from both resin and natural rubber.

The filtration/pressing may be performed as described previously with regard to step "f". In the subsequent step "k", the second miscella comprising the natural rubber is sent to the step of removal of apolar solvent (110) through stripping and/or evaporation for the recovery of the rubber extracted from the plant.

In a preferred aspect, the aforementioned removal of the apolar organic solvent may be carried out by stripping with water vapor, in the presence of a dispersing system.

For that purpose, the second miscella comprising the natural rubber in solution, can be fed to a stripping reactor, or stripper, containing water and including a dispersing system, into which a current of water vapor is conveyed. Part of the water vapor introduced into the system condenses, thus providing the necessary heat for the evaporation of the solvent. In this way, a suspension of lumps of natural rubber in water is obtained.

The dispersing system promotes the stabilization of the suspension, so as to promote its processability (e.g. making it pumpable) and reduces the cohesion of the aforementioned lumps.

In a preferred aspect of the invention, the dispersing system may comprise at least one water-soluble salt of a metal selected from Al, Ca and Mg, and at least one water-soluble surfactant belonging to the family of polycarboxylates. In a preferred aspect of the present invention, said surfactant may be the sodium salt of the copolymer of maleic anhydride and 2,4,4-trimethyl-1-pentene (CAS 37199-81-8). Said surfactant, characterized by extremely limited toxicity, is sold in liquid, water miscible form, with the name Sopropon® T 36 by Rhone-Poulenc, Geropon® T/36 by Rhodia, or Orotan® 731A ER by Rhom & Haas.

Preferably the dispersing system comprises calcium chloride and Orotan® 731A ER. The removal efficiency of the apolar organic solvent through stripping with water vapor in presence of a dispersing system, as described above, is particularly high, since the process for removing the solvent from the rubber takes place simultaneously to the formation of the aforementioned lumps.

The suspension of lumps of rubber in water obtained may be subsequently subjected to the removal of the liquid phase (e.g. through filtration and/or wringing of the lumps) and evaporation of the water.

The wringing of the lumps and the final evaporation of the residual water may be performed in two separate extruders. The first extruder compresses the lumps of rubber, allowing the water to escape in the liquid phase, while the second extruder allows the evaporation of water since, by dissipation of mechanical energy or application of heat, possibly under vacuum conditions, it increases the temperature of the solid phase, allowing, in appropriate degassing zones, the passage of water directly into the vapor form.

At the end of the aforementioned treatment, it is possible to obtain rubber with a volatile matter content, mainly water, of less than 0.75% by weight, and preferably a volatile matter content comprised between 0.75% and 0.5% by weight.

The volatile matter content can be determined with the standard analytical method ASTM D1278-91 (1977).

The residual content of polar and apolar organic solvents, used in the process in accordance with the present invention, within the lumps, is overall less than 4000 ppm.

In a preferred aspect, the residual content of said organic solvents in said rubber may be less than 4000 ppm and greater than or equal to 50 ppm. More preferably, the content of said organic solvents may be comprised between 2000 ppm and 75 ppm.

In a further preferred aspect, the content of said organic solvents may be comprised between 1000 ppm and 100 ppm.

The residual content of organic solvents can be determined through qualitative and quantitative gas chromatography on a fused silica column, using helium as a carrier gas and with a flame ionization detector (FID). To perform the analysis, a sample of rubber, weighed to an accuracy of 0.1 mg, is dissolved in carbon disulfide containing a known quantity of n-octane as internal standard. 1 µl of the solution obtained is injected into the gas chromatograph. The instrument is calibrated by injecting 1 µl of a solution containing a known quantity of the organic solvent to be detected (accuracy of 0.01 mg) in carbon disulfide containing n-octane as internal standard. The minimum quantity detectable using the described method is 1 ppm.

A further advantage of the aforementioned treatment consists of the fact that, after the solvent has been removed, the rubber maintains excellent processability, e.g. in the processes of separation in vibratory sieves, of pressing, extrusion, etc.

The yield of rubber extracted from guayule plants by applying the process in accordance with the invention may be greater than or equal to 80% with respect to the total amount of rubber present in the plants. The aforementioned total amount of rubber is determined by solid state $^{13}$C-NMR spectroscopy, as described by M. Geppi, F. Ciardelli, C, A. Veracini, C. Forte, G. Cecchin, P. Ferrari, in "Dynamics and morphology of polyolefinic elastomers by means of $^{13}$C and $^1$H solid-state n.m.r." (1997), *Polymer*, vol. 38, pag. 5713-5723.

In a preferred aspect, the aforementioned rubber extraction yield may be comprised between 80 and 95%.

The rubber thus obtained is characterized in that it has an average molecular weight comprised between $1 \cdot 10^6$ and $2 \cdot 10^6$ g/mol.

The polydispersity index of the guayule natural rubber obtained with the process according to the invention is preferably comprised between 2 and 5, more preferably comprised between 2.5 and 3.5.

Therefore, further subject matter of the present invention is the guayule rubber obtained with the process in accordance with the invention, characterized by a weight-average molecular mass comprised between $1 \cdot 10^6$ and $2 \cdot 10^6$ g/mol, a content of volatile matter of less than 0.75% by weight and a residual content of organic solvents of less than 4000 ppm.

In a preferred aspect, the residual content of said organic solvents in said rubber may be less than 4000 ppm and greater than or equal to 50 ppm. More preferably, the content of said organic solvents may be comprised between 2000 ppm and 75 ppm.

In a further preferred aspect, the content of said organic solvents may be comprised between 1000 ppm and 100 ppm.

The natural rubber obtained through the process according to the present invention may be processed for a variety of different commercial uses. The properties of guayule natural rubber make it particularly suitable for producing natural rubber items with physical properties similar or superior to those of Hevea brasiliensis natural rubber, particularly suitable for applications in the sector of childcare articles, sports gear and consumables for biomedical use.

Also the second bagasse obtained in step "j", free from resin and rubber but still containing the residual apolar solvent, is subjected to removal of said solvent (120) in step "l" of the process in accordance with the invention, through indirect heat and/or stripping with direct vapor and/or stripping with air at atmospheric pressure or under vacuum.

The bagasse collected at the end of the process may be subject to hydrolysis and fermentation processes which allow a product to be obtained useful as animal feed. It becomes clear that a similar use requires the bagasse to be free from the rubber and resin originally contained.

In other cases the bagasse may be reused in secondary processes for obtaining, for example, bioadhesives or biopesticides, and as a source of second generation sugars converted by fermentation into biofuel and/or bioethanol.

The ligneous material derived from the bagasse can be further processed for obtaining building material, fuel pellets and briquettes, or used in agriculture as a mulch or fertilizer.

The organic solvent recovered from the removal step "l" (120) is combined with the same solvent recovered from the removal step "k" (110), and recycled in the extraction step "i" (90).

For the purpose of putting the present invention into practice and illustrating it more clearly, below are some non-limitative examples.

It is however to be understood that further changes and variations may be made to the process described and illustrated herein which do not depart from the scope of the appended claims.

Example 1 (Test for Extracting Resin and Rubber from Guayule Plants with the Process in Accordance with the Invention)

Approximately 20 guayule plants from experimental fields run by the Applicant in the south of Italy were cut to about 10 cm height above the ground, obtaining about 15 kg of biomass.

The plants were defoliated and kept on pallets in a covered and ventilated environment, in which the temperature and relative humidity were constantly monitored.

After 15 days' preservation in such environment, 100 g of defoliated plants (with residual moisture of 20%) were ground with a hammer mill until fragments smaller than 2 mm were obtained.

The plant material was transferred into a 1 L glass flask containing 500 mL of pure ethanol (95%) in which 0.2 g of Irganox® 565 (4-((4,6-bis(octylthio)-1,3,5-triazin-2-yl)amino)-2,6-di-tert-butylphenol) were dissolved as an antioxidant.

The suspension thus obtained was kept at 45° C. for 1 hour under constant agitation (with a mechanical mixer set to 150 rpm), then it was subjected to filtration using a Gooch filter (porosity 10-15 μm) to separate the miscella enriched in resin (permeated) from the bagasse containing the rubber. In the filtration device the aforementioned bagasse was also subjected to pressing, so as to promote the recovery of the ethanol fraction containing the resin.

From the miscella, subjected to evaporation, 5.5 g of resin were obtained, which represent an extracted product yield of 94% with respect to the quantity of resin contained in the plant. The total quantity of resin contained in the defoliated and partially dried plant was determined using FT-IR spectroscopy.

The bagasse, obtained as described above, was subjected to the removal of the residual ethanol through stripping under vacuum. Subsequently it was weighed (75 g) and transferred into a 1 L glass flask containing 300 mL of pure hexane (95%) in which 0.2 g of Irganox® 565 (4-((4,6-bis(octylthio)-1,3,5-triazin-2-yl)amino)-2,6-di-tert-butylphenol) were dissolved as an antioxidant.

The suspension thus obtained was kept at 55° C. for 1 hour under constant agitation (with a mechanical mixer set to 150 rpm), then it was subjected to filtration through a celite pad (thickness 20 mm) to separate the miscella enriched in resin (permeated) from a second bagasse free from resin and rubber. In the filtration device the aforementioned bagasse was also subjected to pressing, so as to promote the recovery of the liquid fraction containing the rubber in solution.

The miscella enriched in rubber was then subjected to the evaporation of the solvent through stripping to recover the rubber.

4.2 g of rubber were obtained, with a product yield of 80% with respect to the total quantity of rubber contained in the defoliated plant and partially dried determined through $^{13}$C-NMR spectroscopy in the solid state.

The rubber obtained, analyzed through gel permeation chromatography using polystyrene as standard, is characterized by a weight-average molecular mass of $1.6 \cdot 10^6$ g/mol (FIG. 3). The rubber is characterized by a polydispersity index of 2.9, testifying the high quality of the rubber itself.

Comparative Example 2 (Test for Extracting Resin and Rubber from Guayule Plants not Subject to the Preservation Step, According to a Process not in Accordance with the Invention)

The process was performed as for example 1, with the difference that the plants, after defoliation, were immediately subjected to the extraction process, without the preservation step in a controlled temperature and relative humidity environment. The rubber recovered and analyzed through gel permeation chromatography using polystyrene as standard, is characterized by a weight-average molecular mass of $0.48 \cdot 10^6$ g/mol which is 70% lower with respect to the rubber obtained in example 1 and a polydispersity of 3.8.

Comparative Example 3 (Test for Extracting Rubber from Guayule Plants with a Residual Moisture Content Less than 10%, According to a Process not in Accordance with the Invention)

The process was performed as for example 1, with the difference that the plants were kept in a controlled temperature and relative humidity environment until residual moisture of less than 10% was reached.

The extracted resin yield was the same as the yield obtained in the test of example 1, while the yield of extracted rubber went from 80% to 90%. However, the extracted rubber, analyzed through gel permeation chromatography, is characterized by a weight-average molecular mass lower by 30% with respect to the rubber obtained in the test of example 1.

Comparative Example 4 (Test for Extracting Resin and Rubber from Guayule Plants Ground to a Size of Less than 1 cm)

The process was performed as for example 1, with the difference that, after the preservation step, the plants were subjected to grinding until they reached an average size of 1 cm.

In this case the extracted resin yield was comparable to the yield obtained in the test of example 1, while the yield of extracted rubber was lower, declining from 80% to 70%. Finally, it is however to be understood that further changes and variations may be made to the process described and illustrated herein which do not depart from the scope of the appended claims.

The invention claimed is:

1. Process for extracting resin and rubber from guayule plants, comprising:
    a. harvesting guayule plants;
    b. defoliating said plants;
    c. preserving the defoliated plants in environments at controlled temperature and relative humidity, for a time between 7 and 21 days, so that the residual moisture contained in the plant is maintained in the range of 30-45%;
    d. grinding said defoliated plants up to obtain a plant material comprising plant fragments with average sizes between 0.5 and 10 mm;
    e. dispersing said plant material in a polar solvent system, comprising at least one polar organic solvent and a stabilizer system, to obtain a suspension;
    f. subjecting the obtained suspension from step "e" to filtration/pressing to separate a first miscella comprising said resin from a first bagasse;
    g. removing the at least one polar organic solvent from said first miscella to obtain the concentrated resin;
    h. removing the at least one polar organic solvent from the first bagasse obtained in step "f";
    i. dispersing said first desolventized bagasse obtained in step "h" in an apolar solvent system, comprising at least one apolar organic solvent and a stabilizer system, to obtain a suspension;
    j. subjecting said suspension obtained in step "i" to filtration/pressing to separate a second miscella comprising said rubber from a second bagasse;
    k. removing the at least one apolar organic solvent from said second miscella to obtain rubber in the solid state;
    l. removing the at least one apolar organic solvent from the second bagasse obtained in step "j".

2. Process according to claim 1, wherein the steps of said process are conducted in sequence from "a" to "l".

3. Process according to claim 1, wherein the harvesting of guayule plants is performed at the resumption of the vegetative period of said plants.

4. Process according to claim 1, in which the plants are harvested with a size greater than or equal to 8 cm and less than or equal to 20 cm.

5. Process according to claim 1, wherein step "c" is performed for a time comprised between 10 and 15 days, in an environment in which the temperature is kept constantly between 15 and 40° C. and/or in which the relative humidity is kept consistently between 80% and 95%.

6. Process for extracting resin and rubber from guayule plants, comprising:
    a. harvesting guayule plants;
    b. preserving said plants in environments at controlled temperature and relative humidity, for a time between 7 and 21 days, so that the residual moisture contained in the plant is maintained in the range of 30-45%;
    c. defoliating said plants;
    d. grinding said defoliated plants up to obtain a plant material comprising plant fragments with average sizes between 0.5 and 10 mm;
    e. dispersing said plant material in a polar solvent system, comprising at least one polar organic solvent and a stabilizer system, to obtain a suspension;
    f. subjecting the obtained suspension from step "e" to filtration/pressing to separate a first miscella comprising said resin from a first bagasse;
    g. removing the at least one polar organic solvent from said first miscella to obtain the concentrated resin;
    h. removing the at least one polar organic solvent from the first bagasse obtained in step "f";
    i. dispersing said first desolventized bagasse obtained in step "h" in an apolar solvent system, comprising at least one apolar organic solvent and a stabilizer system, to obtain a suspension;
    j. subjecting said suspension obtained in step "i" to filtration/pressing to separate a second miscella comprising said rubber from a second bagasse;
    k. removing the at least one apolar organic solvent from said second miscella to obtain rubber in the solid state;
    l. removing the at least one apolar organic solvent from the second bagasse obtained in step "j".

7. Process according to claim 1, wherein the grinding step "d" is performed using one or more hammer mills.

8. Process according to claim 1, wherein said step "d" is performed using in sequence one or more hammer mills and one or more corrugated roll mills or one or more smooth roll mills.

9. Process according to claim 1, in which the fragments of plant material obtained through the grinding step "d" have an average size between 0.5 and 7.5 mm.

10. Process according to claim 1, wherein in step "e" of said process the ratio between the volume of the polar solvent system and the weight of the plant material is between 1 and 7.

11. Process according to claim 1, wherein the polar solvent system used in step "e" comprises at least one polar organic solvent selected from an alcohol having from 1 to 8 carbon atoms, ethers and esters having from 2 to 8 carbon atoms, cyclic ethers having from 4 to 8 carbon atoms, ketones having from 3 to 8 carbon atoms, or mixtures thereof.

12. Process according to claim 11, wherein said polar organic solvent is selected from ethanol and acetone.

13. Process according to claim 1, wherein said polar solvent system is placed in contact with the plant material in one or more stages in countercurrent, with or without agitation, for a time comprised between 0.1 and 5 hours, at a temperature between 25° C. and the boiling point of the polar organic solvent used.

14. Process according to claim 1, wherein said filtration/pressing of step "f" is carried out at a temperature between 25° C. and 50° C.

15. Process according to claim 1, wherein in step "i" of said process the ratio between the volume of the apolar solvent system and the weight of the first bagasse is between 1.5 and 7.

16. Process according to claim 1, wherein the apolar solvent system used in step "i" comprises at least one hydrocarbon solvent selected from linear or branched alkanes having from 4 to 9 carbon atoms, cycloalkanes or akylcycloalkanes having 5 to 10 carbon atoms, aromatic hydrocarbons having from 6 to 10 carbon atoms, or mixtures thereof.

17. Process according to claim 16, wherein said hydrocarbon solvent is selected from hexane and cyclohexane.

18. Process according to claim 1, wherein said apolar solvent system is placed in contact with the first bagasse in one or more stages in countercurrent, with or without agitation, for a time between 0.1 and 5 hours, at a temperature between 25° C. and the boiling point of the apolar organic solvent used.

19. Process according to claim 1, wherein the removal of the apolar organic solvent of step "k" from the second mixture comprising the natural rubber is carried out by stripping with water vapor, in the presence of a dispersing system.

20. Process according to claim 19, wherein said dispersing system comprises at least one water-soluble salt of a metal selected from Al, Ca and Mg, and at least one water-soluble surfactant belonging to the family of polycarboxylates.

21. Process according to claim 1, wherein the yield of rubber extracted from guayule plants is greater than or equal to 80% with respect to the total amount of rubber present in plants.

22. Guayule rubber obtained with the process in accordance with claim 1, characterized by a weight-average molecular mass comprised between $1.10^6$ and $2.10^6$ g/mol, a content of volatile matter of less than 0.75% by weight and a residual content of organic solvents of less than 4000 ppm.

23. Guayule rubber according to claim 22, wherein the content of said organic solvents is less than 4000 ppm and greater than or equal to 50 ppm.

24. Guayule rubber according to claim 22, wherein the polydispersity index is comprised between 2 and 5.

* * * * *